US012639108B2

(12) United States Patent
Berry et al.

(10) Patent No.: US 12,639,108 B2
(45) Date of Patent: May 26, 2026

(54) SCALING A REST CLUSTER USING TASK PROCESSING LOGIC

(71) Applicant: Nuix Limited, Sydney (AU)

(72) Inventors: Daniel Berry, Philadelphia, PA (US);
Bruce Brown, Hatboro, PA (US);
Frank Marrone, Howell, NJ (US)

(73) Assignee: Nuix Limited, Sydney (AU)

( * ) Notice: Subject to any disclaimer, the term of this patent is extended or adjusted under 35 U.S.C. 154(b) by 417 days.

(21) Appl. No.: 18/114,013

(22) Filed: Feb. 24, 2023

(65) Prior Publication Data

US 2023/0267395 A1     Aug. 24, 2023

Related U.S. Application Data

(60) Provisional application No. 63/313,338, filed on Feb. 24, 2022, provisional application No. 63/313,341, filed on Feb. 24, 2022.

(51) Int. Cl.
| | |
|---|---|
| *G06F 9/46* | (2006.01) |
| *G06F 9/38* | (2018.01) |
| *G06F 9/48* | (2006.01) |
| *G06Q 10/0631* | (2023.01) |

(52) U.S. Cl.
CPC .......... *G06F 9/4881* (2013.01); *G06F 9/3891* (2013.01); *G06Q 10/06316* (2013.01)

(58) Field of Classification Search
CPC ................ G06F 9/4881; G06F 9/3891; G06Q 10/06316
See application file for complete search history.

(56) References Cited

U.S. PATENT DOCUMENTS

| | | | |
|---|---|---|---|
| 7,203,801 | B1 | 4/2007 | Sharma et al. |
| 8,370,842 | B2 | 2/2013 | Bellows et al. |
| 8,620,842 | B1 | 12/2013 | Cormack |
| 8,713,023 | B1 | 4/2014 | Cormack et al. |
| 8,838,606 | B1 | 9/2014 | Cormack et al. |
| 8,978,036 | B2 | 3/2015 | Fletcher et al. |
| 9,122,681 | B2 | 9/2015 | Cormack et al. |
| 9,146,777 | B2 | 9/2015 | Iniguez |
| 9,678,957 | B2 | 6/2017 | Cormack et al. |

(Continued)

FOREIGN PATENT DOCUMENTS

CN                110858160 A        3/2020

OTHER PUBLICATIONS

Aragon, C., et al., "Scaling A NUIX Rest Cluster to One Terabyte Per Hour," retrieved from the internet at: <https://www.nuix.com/sites/default/files/downloads/Nuix_REST_Cluster_White_Paper_Long_US.pdf>, Apr. 27, 2022, 25 pages.

(Continued)

*Primary Examiner* — Gregory A Kessler
(74) *Attorney, Agent, or Firm* — Nutter McClennen & Fish LLP

(57)                    ABSTRACT

Illustrative embodiments process large amounts of unstructured data by producing, from the unstructured data, a plurality of work items. Each work item includes an item of unstructured data, and corresponding work item metadata. Each work item may be claimed by a corresponding consumer node. In illustrative embodiments, a consumer node claims a work item only when the work item is compatible with the consumer node. The consumer node then processes the claimed work item by performing a specified task on the item of unstructured data associated with the work item.

18 Claims, 6 Drawing Sheets

(56)                    References Cited

U.S. PATENT DOCUMENTS

| | | | |
|---|---|---|---|
| 9,852,004 | B2 | 12/2017 | Iniguez |
| 9,916,188 | B2 | 3/2018 | Shau et al. |
| 10,089,143 | B2 | 10/2018 | Fletcher et al. |
| 10,229,117 | B2 | 3/2019 | Cormack et al. |
| 10,242,001 | B2 | 3/2019 | Cormack et al. |
| 10,353,961 | B2 | 7/2019 | Cormack et al. |
| 10,445,374 | B2 | 10/2019 | Cormack et al. |
| 10,592,275 | B2 | 3/2020 | Iniguez |
| 10,671,675 | B2 | 6/2020 | Cormack et al. |
| 11,080,340 | B2 | 8/2021 | Cormack et al. |
| 11,347,544 | B1 | 5/2022 | Spivak et al. |
| 11,681,547 | B2 | 6/2023 | Ma et al. |
| 11,734,072 | B2 | 8/2023 | Parker |
| 2014/0379619 | A1 | 12/2014 | Permeh et al. |
| 2019/0138654 | A1 | 5/2019 | Arora et al. |
| 2019/0188315 | A1 | 6/2019 | Hsieh et al. |
| 2020/0319941 | A1 | 10/2020 | Sharique |
| 2023/0145846 | A1 | 5/2023 | Waite et al. |
| 2023/0153124 | A1 | 5/2023 | Zhao et al. |
| 2023/0267395 | A1 | 8/2023 | Berry et al. |

OTHER PUBLICATIONS

International Search Report and Written Opinion for International Application No. PCT/US2023/013782, mailed Jun. 13, 2023 (13 pages).
International Search Report and Written Opinion for International Application No. PCT/IBUS2023/000097, mailed Jun. 30, 2023.
Non-Final Office Action for U.S. Appl. No. 18/113,989, dated Jul. 2, 2025, 29 pages.

400

435

450

SCALING A REST CLUSTER USING TASK PROCESSING LOGIC

PRIORITY

This application claims the benefit of U.S. Provisional Application No. 63/313,341, entitled "SCALING A REST CLUSTER USING TASK PROCESSING LOGIC," filed Feb. 24, 2022 and naming Daniel Berry; Bruce Brown; and Frank Marrone as inventors.

This application claims the benefit of U.S. Provisional Application No. 63/313,338, entitled "SCALING A REST CLUSTER USING FEATURE BASED STEERING," filed Feb. 24, 2022 and naming Daniel Berry; Bruce Brown; and Frank Marrone as inventors.

The content of each of the foregoing is hereby incorporated by reference in its entirety.

FIELD OF THE INVENTION

The present invention generally relates to the field of normalizing unstructured data, and more particularly, server task processing logic in the area of eDiscovery and information governance.

BACKGROUND

Businesses use cloud computing services such as Microsoft's Office 365, Exchange On-line, SharePoint on-line, Google's Gmail, Google Drive or others to host and store billions of electronic items. Countless emails are sent and received daily. People (e.g., employees, independent contractors, etc.) and computers and other systems routinely generate new documents and store them on cloud storage systems. Paper documents are scanned and sent by email. Many pictures and flat files are converted into digital text by optical character recognition. All of this activity produces electronic data that is highly unstructured.

Investigations, eDiscovery, regulatory compliance, and other similar use cases present a need to normalize terabytes, petabytes, and even zettabytes of data efficiently. However, increasing volume and complexity of data continues to challenge the ability to defensibly process vast amounts of unstructured content for eDiscovery, investigations, regulatory compliance, and other use cases.

SUMMARY

A first embodiment includes a computer-implemented system for distributing data to processing nodes. The system includes a producer node configured to: receive a set of unstructured data items, create a set of work items based upon the set of unstructured data items, wherein each work item of the set of work items includes a data item from the set of unstructured data items and a plurality of work item metadata corresponding to said data item, and populate a work item queue with the set of work items.

The system also includes a plurality of consumer nodes. Each consumer node of the plurality of consumer nodes includes corresponding node status data, and is configured to:

repeatedly poll the work item queue to identify a set of work items that are compatible with the consumer node based on the plurality of work item metadata, a filter chain, and the node status data, and to claim said work items from the work item queue, wherein each consumer node of the plurality of consumer nodes produces a corresponding set of selectively claimed work items.

In some system embodiments, the filter chain includes a plurality of true/false conditions. In some such embodiments, the plurality of true/false conditions includes one or more of: a case exists filter, a task status filter, a capacity filter, a node tag filter, and a worker-based task filter.

In some system embodiments, the node status data includes one or more of capacity status, consumer node tag, and worker status.

In some system embodiments, if a consumer node is stressed it does not claim work from the work queue.

In some system embodiments, the plurality of consumer nodes have the same node status data.

Another embodiment includes a computer-implemented method of distributing a plurality of documents among a plurality of consumer nodes, each consumer node of the plurality of consumer nodes having corresponding node status data. The method includes, for each consumer node of the plurality of consumer node:

accessing a work item queue, wherein the work item queue includes a plurality of work items, each work item of the plurality of work items including (i) a document from the plurality of documents and (ii) work item metadata corresponding to said document;

identifying from the plurality of work items a work item that is compatible with the consumer node;

claiming said work item corresponding to the consumer node; and repeating said steps as long as the consumer node is not stressed and the work item queue includes at least one work item corresponding to the consumer node, which at least one such work item has not been claimed by a one of the consumer node.

In some embodiments of the method, identifying from the plurality of work items a work item that is compatible with the consumer node includes identifying, via a filter chain, a work item for which the work item metadata for the given work item matches the consumer node metadata. In some embodiments, the filter chain includes a plurality of true/false conditions. In some such embodiments, the plurality of true/false conditions include one or more of: a case exists filter, a task status filter, a capacity filter, a node tag filter, and a worker based task filter.

In some embodiments of the method, the node status data includes one or more of capacity status, node tag, and worker status.

In some embodiments of the method, a consumer node declines to claim a work item of any item of the filter chain analysis returns FALSE.

Another embodiment includes a non-transitory computer-readable medium storing computer-executable code thereon, the code including: code for accessing, at a consumer node, a work item queue including a plurality of work items, wherein each work item of in the plurality of work items includes an item of unstructured data and work item metadata; and for each work item of the plurality of work items: code for analyzing the work item metadata according to a filter chain; code for analyzing node status data according to the filer chain; and code for claiming a work item of the plurality of work items based on the analysis of the work item metadata and the analysis of the node status data.

In some embodiments, the filter chain includes a plurality of true/false conditions.

In some embodiments, the plurality of true/false conditions includes one or more of: a case exists filter, a task status filter, a capacity filter, a node tag filter, and a worker-based task filter.

In some embodiments, the node status data includes one or more of capacity status, node tag, and worker status.

In some embodiments, the code further includes: code for determining whether the consumer node is stressed, and for causing the consumer node to decline to claim a work item from the work queue accordingly.

In some embodiments, the code further includes: code for operating a plurality of consumer nodes in parallel, each such consumer node having the same node status data.

In some embodiments, wherein each work item as a task status tag in the work item's metadata, the code further includes: code for, after claiming a work item from the work item queue, setting the task status tag to indicate that said work item has been claimed so that said work item will not be claimed by another consumer node.

In some embodiments, code for claiming a work item of the plurality of work items based on the analysis of the work item metadata and the analysis of the node status data includes: code for determining whether the consumer node is specialized to process the work item.

Another embodiment includes a computer-implemented system for distributing data to processing nodes. The system includes:

a set of producer nodes, each such producer node configured to:

receive a plurality of data items, the plurality of data items including a set of data items, and a plurality of operation tags, the plurality of operation tags including a set of operation tags, each operation tag of the set of operation tags specifying an operation selected from a set of operations, each operation tag uniquely associated with a corresponding data item from the set of data items;

create a plurality of work items, each work item including a data item from the set of data items bound to the operation tag uniquely associated with said data item;

populate a work item queue with the set of work items; and expose the work item queue to a plurality of consumer nodes, each consumer node of the plurality of consumer nodes configured to selectively claim one or more work items from the work item queue.

In some such embodiments, each consumer node of the plurality of consumer nodes is specialized to perform an operation selected from the plurality of operations.

In some embodiments, each consumer node of the plurality of consumer nodes is specialized to perform an operation selected from the plurality of operations; and each consumer node of the plurality of consumer nodes is configured to assess work items from the work item queue to determine, for each such work item, whether said consumer node is specialized to perform the operation specified by the operation tag of the work item.

In some embodiments, each consumer node of the plurality of consumer nodes is specialized to perform an operation selected from the plurality of operations; and each consumer node of the plurality of consumer nodes is configured to:

(a) assess work items from the work item queue to ascertain, for each such work item, that said consumer node is specialized to perform the operation specified by the operation tag of the work item, each such work item being a compatible work item, and (b) to claim the compatible work item for processing by the consumer node, to the exclusion of other consumer nodes from the plurality of consumer nodes, said compatible work item being a claimed work item.

In some such embodiments, each work item includes a status tag indicating whether such work item has been claimed by a consumer node from the plurality of consumer nodes, and each consumer node is configured to update the status tag of each claimed work item claimed by said consumer node, so that the status tag of said work item indicates that said work item has been claimed by a consumer node from the plurality of consumer nodes.

In some embodiments, the producer node is further configured to include, in each work item, a status tag, said status tag editable by a consumer node to indicate that said consumer node has claimed the work item.

In some embodiments, the plurality of data items include a plurality of unstructured data items.

Some embodiments include a method of distributing data to processing nodes. The method includes:

receiving, at set of produce nodes, a plurality of data items, the plurality of data items including a set of data items, and a plurality of operation tags, the plurality of operation tags including a set of operation tags, each operation tag of the set of operation tags specifying an operation selected from a set of operations, each operation tag uniquely associated with a corresponding data item from the set of data items;

creating a plurality of work items, each work item including a data item from the set of data items bound to the operation tag uniquely associated with said data item;

populating a work item queue with the set of work items; and exposing the work item queue to a plurality of consumer nodes, each consumer node of the plurality of consumer nodes configured to selectively claim one or more work items from the work item queue.

In some such embodiments, each consumer node of the plurality of consumer nodes is specialized to perform an operation selected from the plurality of operations.

In some embodiments, each consumer node of the plurality of consumer nodes is specialized to perform an operation selected from the plurality of operations; and each consumer node of the plurality of consumer nodes is configured to assess work items from the work item queue to determine, for each such work item, whether said consumer node is specialized to perform the operation specified by the operation tag of the work item.

In some embodiments, each consumer node of the plurality of consumer nodes is specialized to perform an operation selected from the plurality of operations; and each consumer node of the plurality of consumer nodes is configured to:

(a) assess work items from the work item queue to ascertain, for each such work item, that said consumer node is specialized to perform the operation specified by the operation tag of the work item, each such work item being a compatible work item, and (b) to claim the compatible work item for processing by the consumer node, to the exclusion of other consumer nodes from the plurality of consumer nodes, said compatible work item being a claimed work item.

In some embodiments, each work item includes a status tag indicating whether such work item has been claimed by a consumer node from the plurality of consumer nodes, and each consumer node is configured to update the status tag of each claimed work item claimed by said consumer node, so that the status tag of said work item indicates that said work item has been claimed by a consumer node from the plurality of consumer nodes.

In some embodiments, the producer node is further configured to include, in each work item, a status tag, said status tag editable by a consumer node to indicate that said consumer node has claimed the work item.

In some embodiments, the plurality of data items include a plurality of unstructured data items.

Another embodiments includes a non-transitory computer-readable medium storing computer-executable code thereon, the code including:

code for receiving, as a set of producer nodes, a plurality of data items, the plurality of data items including a set of data items, and a plurality of operation tags, the plurality of operation tags including a set of operation tags, each operation tag of the set of operation tags specifying an operation selected from a set of operations, each operation tag uniquely associated with a corresponding data item from the set of data items;

code for creating a plurality of work items, each work item including a data item from the set of data items bound to the operation tag uniquely associated with said data item;

code for populating a work item queue with the set of work items; and code for exposing the work item queue to a plurality of consumer nodes, each consumer node of the plurality of consumer nodes configured to selectively claim one or more work items from the work item queue.

In some such embodiments, each consumer node of the plurality of consumer nodes is specialized to perform an operation selected from the plurality of operations.

In some embodiments, each consumer node of the plurality of consumer nodes is specialized to perform an operation selected from the plurality of operations; and each consumer node of the plurality of consumer nodes is configured to assess work items from the work item queue to determine, for each such work item, whether said consumer node is specialized to perform the operation specified by the operation tag of the work item.

In some embodiments, each consumer node of the plurality of consumer nodes is specialized to perform an operation selected from the plurality of operations; and each consumer node of the plurality of consumer nodes is configured to:

(a) assess work items from the work item queue to ascertain, for each such work item, that said consumer node is specialized to perform the operation specified by the operation tag of the work item, each such work item being a compatible work item, and (b) to claim the compatible work item for processing by the consumer node, to the exclusion of other consumer nodes from the plurality of consumer nodes, said compatible work item being a claimed work item.

In some embodiments, each work item includes a status tag indicating whether such work item has been claimed by a consumer node from the plurality of consumer nodes, and each consumer node is configured to update the status tag of each claimed work item claimed by said consumer node, so that the status tag of said work item indicates that said work item has been claimed by a consumer node from the plurality of consumer nodes.

In some embodiments, the producer node is further configured to include, in each work item, a status tag, said status tag editable by a consumer node to indicate that said consumer node has claimed the work item.

tag editable by a consumer node to indicate that said consumer node has claimed the work item.

Yet another embodiment includes a computer-implemented system for processing a plurality of data items, the system including:

a work item queue storing a set of work items, each work item including a plurality of work items, each work item of the plurality of work items including (i) a data item from the plurality of data items and (ii) work item metadata corresponding to said data item;

a plurality of consumer nodes, each consumer nodes of the plurality of consumer nodes including corresponding node status data, wherein each consumer node of the plurality of consumer nodes is specialized to perform an operation selected from the plurality of operations, and is configured to:

access the work item queue;

identify, using a filter chain, a work item from the plurality of work items that is compatible with the consumer node; and claim said work item corresponding to the consumer node.

In some such embodiments, the work item metadata of each work item includes an operation tag specifying an operation to be performed on the data item of the work item, and the node status data of each consumer node specified an operation for which the consumer node is specialized, and each consumer node is configured to identify a work item that is compatible with the consumer node by determining that the operation to be performed on the data item of the work item, as specified by the work item operation tag, matches the operation for which the consumer node is specialized as specified in the node status data.

In some embodiments, the work item metadata of each work item includes a status tag recording the status of whether the work item has been previously claimed by a consumer node from the plurality of consumer nodes; and each consumer node is configured to assess the status tag of a work item and to refrain from claiming any work item having a status tag indicating that the work item has been previously claimed by a consumer node from the plurality of consumer nodes.

In some embodiments, each consumer node is configured to determine that it is stressed, and consequently to refrain from claiming any work item.\

In some embodiments, each consumer node is configured to determine that the consumer node lacks access to a work item, and consequently to refrain from claiming the work item.

In some embodiments, each consumer node of the plurality of consumer nodes is configured to assess work items from the work item queue to determine, for each such work item, whether said consumer node is specialized to perform the operation specified by the operation tag of the work item.

In some embodiments, the system further includes a set of producer nodes, each such producer node configured to:

receive a plurality of data items, the plurality of data items including a set of data items, and a plurality of operation tags, the plurality of operation tags including a set of operation tags, each operation tag of the set of operation tags specifying an operation selected from a set of operations, each operation tag uniquely associated with a corresponding data item from the set of data items;

create the plurality of work items, each work item including a data item from the set of data items bound to the operation tag uniquely associated with said data item;

populate the work item queue with the set of work items; and expose the work item queue to the plurality of consumer nodes, each consumer node of the plurality of consumer nodes configured to selectively claim one or more work items from the work item queue.

Yet another embodiment includes a computer-implemented method of distributing a plurality of data items among a plurality of consumer nodes, each consumer node of the plurality of consumer nodes having corresponding node status data. The method includes, for each consumer node of the plurality of consumer nodes:

accessing a work item queue, wherein the work item queue includes a plurality of work items, each work item of the plurality of work items including (i) a data item from the plurality of data items and (ii) work item metadata corresponding to said data item, said work item metadata including at least an operation tag specifying an operation to be performed on said data item;

identifying from the plurality of work items in the work item queue a work item that is compatible with the consumer node;

claiming said work item; and performing the operation on the data item of the work item.

In some embodiments, identifying a work item that is compatible with the consumer node includes identifying said work item by application of a filter chain.

In some such embodiments, the filter chain includes a plurality of true/false conditions.

In some embodiments, a consumer node declines to claim a work item of any item of the filter chain analysis returns FALSE.

In some embodiments, the filter chain includes: a case exists filter that assess whether the consumer node has access to the work item.

In some embodiments, the filter chain includes: a task status filter that assesses a status tag to determine whether a given task has already been claimed by another consumer node.

In some embodiments, the filter chain includes: a node tag filter that assesses a consumer node tag and a work item's operation tag to determine whether the consumer node is specialized to perform the operation specified by the work item's operation tag.

In some embodiments, the filter chain includes: a capacity filter that assesses whether the consumer node is not stressed.

Yet another embodiment includes a non-transitory computer-readable medium storing computer-executable code thereon, the code including:

code for accessing a work item queue, wherein the work item queue includes a plurality of work items, each work item of the plurality of work items including (i) a data item from the plurality of data items and (ii) work item metadata corresponding to said data item, said work item metadata including at least an operation tag specifying an operation to be performed on said data item;

code for identifying from the plurality of work items in the work item queue a work item that is compatible with the consumer node;

code for claiming said work item; and code for performing the operation on the data item of the work item.

In some such embodiments, the code for identifying from the plurality of work items in the work item queue a work item that is compatible with the consumer node includes code for identifying said work item by application of a filter chain.

In some embodiments, the filter chain includes a plurality of true/false conditions.

In some embodiments, the filter chain includes:

a case exists filter that assess whether the consumer node has access to the work item; and/or a task status filter that assesses a status tag to determine whether a given task has already been claimed by another consumer node; and/or a node tag filter that assesses a consumer node tag and a work item's operation tag to determine whether the consumer node is specialized to perform the operation specified by the work item's operation tag; and/or a capacity filter that assesses whether the consumer node is not stressed.

DETAILED DESCRIPTION

Figure 1A:
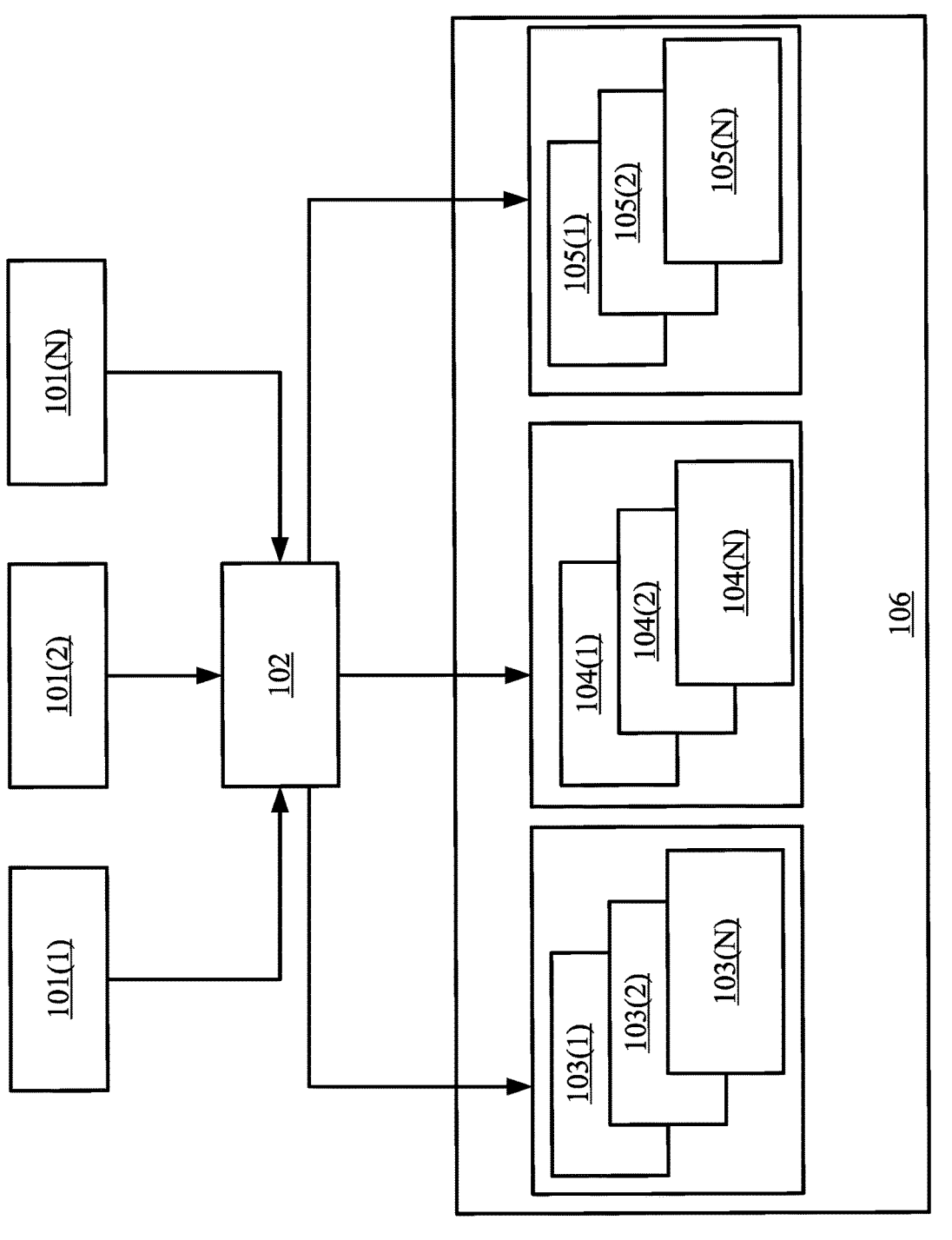
FIG. 1A and FIG. 1B schematically illustrate an embodiment of a system for processing unstructured data.

Illustrative embodiments include systems and methods for normalizing unstructured data by utilizing task processing logic. By utilizing task processing logic, it becomes possible to process zettabytes of information quicker and more efficiently than conventional systems and methods. Processing data at rapid speeds allows for more efficient eDiscovery, investigations, and regulatory compliance investigations. Illustrative embodiments incorporate a single point of interaction for a REST cluster provides for horizontal scalability and more efficient use of computing resources.

Illustrative embodiments improve systems and methods for normalizing unstructured data for the purposes of eDiscovery, investigations, regulatory compliance, and other such use cases.

Conventional systems and methods may utilize a primary node to distribute data to a group of secondary nodes, whereby each secondary node process data assigned to is by the primary node. Such conventional systems and methods assigned data to a secondary node without consideration for whether the secondary node is configured to process the data according to a task for which the primary node assigned the data to the secondary node, and/or without consideration for whether the secondary node is stressed (i.e., without consideration for whether the secondary node has, at the time the data is assigned to it by the primary node, resources sufficient to process the data according to a task for which the primary node assigned the data to the secondary node). Such a method may be thought-of as a "cram-down"

method. In addition, the process of a primary node handing out work to the secondary nodes is time consuming for servers and is inefficient.

In contrast, illustrative embodiments improve the ability and efficiency of systems and methods to distribute work items. For example, in illustrative embodiments, a server imposes some structure on previously unstructured data and, instead of a primary server assigning the data to a secondary server, such illustrative embodiments allow each secondary server to claim such an item of structured data based on an analysis, by the secondary server, of each data item, the secondary server's configuration (e.g., whether the secondary server is specialized to perform a task on the data item), and whether the secondary server has resources sufficient to perform the task on the data item. Consequently, in illustrative embodiments, utilizing task processing logic and a work-stealing methodology, secondary nodes claim work items from the primary node at speeds that allow for the structuring of zettabytes of data in a matter of a day or so, what would have taken a week or more using conventional methodologies on the same hardware.

Illustrative embodiments allow for managing work across multiple virtual or physical machines, increased automation, and the ability to pursue an always-on model appropriately sized for the system's needs.

Definitions: As used in this description and the accompanying claims, the following terms shall have the meanings indicated, unless the context otherwise requires.

The term "data" shall refer to any collection of numbers, characters, images, instructions, or other forms of information in an electronic format. Examples of data may include, but are not limited to, electronic documents, electronic mail messages, PST files, an electronic document embedded within another file, and a directory containing millions of office documents.

The term "document" means an item of data in electronic (e.g., digital) form, including, without limitation, an exchangeable database file, a disk image file, a word processor document, a PDF document, a text message, a calendar entry, a chat message, a chat conversation having a plurality of messages, a contact listing (e.g., from a mobile phone's directory or an email system's directory), a container, a database, a drawing (e.g., from Microsoft® Visio), an email, an image file, a log, a multimedia file, a presentation file (e.g., from Microsoft® PowerPoint), a spreadsheet (e.g., from Microsoft® Excel), a plain text file; a binary file, and/or an electronic file in unrecognized format, so name but a few examples.

The term "node status data" means data associated with a consumer node. Node status data may include, for example, a capacity datum (e.g., a binary datum indicating whether the node is stressed); a set of configuration datums, each configuration datum indicating an aspect of the node's configuration. A configuration datum (which may also be referred-to as a "consumer node tag") may indicate, for example, that the consumer node is configured to perform a certain operation on data in a work item.

The term "processor" shall refer to any computer with at least one processing means. Examples of a processor may include, but are not limited to, single or multiple computers having multi-core processing means.

The term "specialized," in reference to a server or node, means that the server or node includes resources (e.g., software and/or memory and/or computer processing capacity) to process a work item. For example, a server specialized to perform optical character recognition (e.g., of a PDF file) includes software configured to perform that optical character recognition. A server specialized to determine whether a digital image includes a picture of a cat includes software (e.g., a trained neural network) configured to determine whether a digital image includes a picture of a cat. Examples of specialized nodes include, but are not limited to, ingestion nodes, optical character recognition ("OCR") nodes 104, and search nodes 105, to name but a few examples.

The term "stressed," in reference to a node, mean that the node does not have resources (e.g., memory, CPU availability) to process additional work items. In illustrative embodiments, a node (e.g., a computer system) is deemed to be stressed at a point in time based on the percentage of its memory that is being utilized at that point in time. For example, a node may be deemed to be stressed at a point in time if processes executing on the node are utilizing 80% of the node's system memory. In other embodiments, a node may be deemed to be stressed at a point in time if processes executing on the node are utilizing 70%, or 75%, or 85%, or 90% of the node's system memory. In other embodiments, a node (e.g., a computer system) is deemed to be stressed at a point in time based on the percentage of central processing unit ("CPU") processing capacity is being used by processes executing on the node. For example a node may be deemed to be stressed at a point in time if processes executing on the node at that point in time are utilizing 70%, or 75%, 80%, 85%, 90% or 95% of the node's central processing unit processing capacity.

The term "unstructured data" shall refer to data that is not arranged according to a preset data model.

The term "work item metadata" means metadata that describes a work item. In illustrative embodiments, work item metadata of a given work item may be processed to determine whether the given work item correlates to a specified consumer node. Work item metadata may include, for example, a "task status" tag (a binary datum that indicates whether the work item has been claimed by a consumer node); an "item type" tag (a datum that indicates the type of data within the work item; e.g., when the data within the work item is a document, the "item type" datum indicates the format of the document, such as a Word document, txt document; PDF document, to name but a few examples); an "operation" tag (a datum indicating the type of operation to be performed on the data within then work item; e.g., optical character recognition; format translation; ingestion; ingest data item; export work item; search work item; to name but a few examples). Work item metadata may also include, but is not limited to, location data indicating the physical location of the data, and/or a globally unique identifier of the processing job of which the work item is a member, and/or an identifier specifying the identity of the invoker that provided a data item to a producer node.

A "worker" means an instance of operation capacity executing at or on a consumer node. For example, if a consumer node is configured to perform optical character recognition, that consumer node may have one or more instances of optical character recognition software running, or prepared to run, on the consumer node, and each such instance is a "worker."

As used herein, the word "or" means "and or or", sometimes seen or referred to as "and/or", unless indicated otherwise.

The present disclosure generally relates to the field of processing data, or normalizing unstructured data. Illustrative systems and methods leverage feature-based steering to direct data to specialized processors for efficient data processing. The system may include a producer processor and a plurality of consumer processors. The producer processor, or producer node, is configured to respond to synchronous tasks, such as returning function status, and is responsible for placing asynchronous worker-based operations in a cluster task queue. The application programming interface (API) also checks queue status, including queue capacity, size, and status of the tasks in the data buffer. Producer nodes do not perform asynchronous tasks or worker-based operations such as processing, optical character recognition (OCR), or export.

Consumer processors, or consumer nodes, claim and execute asynchronous or worker-based operations.

Some embodiments use a filter chain comprising TRUE/FALSE logic gates to poll the task queue and claim tasks they have capacity to process. If all filters return TRUE, then the consumer node locks and claims the task. If one or more filters return FALSE, the consumer node does not claim the task. This results in natural load-balancing. Depending on the scale of work needing to be processed, the system is horizontally scalable to meet the processing needs of the user. That is, as the rate of processing increases, more consumer nodes can be added to the system to meet the processing needs.

Filters that may be implemented may include, but are not limited to, a case exists filter, task status filter, capacity filter, node tag filter, and worker-based task filter.

For example, a case exists filter checks that the consumer node 170 has local access to the work item 160. If the does not have local access (e.g., via a work item queue 185) to the work item 160, then the case exists filter returns "False," and the consumer node 170 will decline to claim the work item 160. Conversely, if the consumer node 170 does have local access (e.g., via a work item queue 185) to the work item 160, then the case exists filter returns "True," and the consumer node 160 may claim the work item 160.

A task status filter checks that the work item 160 has not yet been claimed (e.g., by another consumer node 160). If the work item 160 has been claimed, the filter is deemed to have returned "FALSE," and the consumer node 170 will decline to claim the work item 160. Conversely, if the work item 160 has not been claimed, the filter is deemed to have returned "TRUE," and the consumer node 170 may claim the work item 160. The task status filter ensures the consumer node 160 will only claim a task in the "NOT_STARTED" state (i.e., when the task status filter returns "TRUE").

Some filters operate on node status data. For example, a capacity filter checks whether the consumer node is not stressed. If the consumer node 160 is stressed, the filter is deemed to have returned "FALSE," and then the consumer node 160 will decline to claim the work item 160. Conversely, if the consumer node is not stressed, the filter is deemed to have returned "TRUE," and then the consumer node 170 may claim the work item 160. The capacity filter assures that that the consumer node 170 will only claim a task if the task executor on the node has capacity.

Consumer nodes that are stressed or otherwise do not have the resources to complete a task do not claim a task for execution.

A node tag filter assesses the operation tag of a work item to determine whether the consumer node is specialized to perform, on the data item within a work item 160, the operation indicated by the work item's node tag. If the consumer node 170 is specialized to perform the operation indicated by the work item's node tag, then the node tag filter returns "TRUE." If the consumer node 170 is not specialized to perform the operation indicated by the work item's node tag, then the node tag filter returns "FALSE."

A consumer node 170 that is not stressed, and that is specialized to perform the operation indicated by the work item's node tag, may still decline to claim the work item if the consumer node does not have enough workers to process an additional work item, for example because all of the workers of the consumer node 170 are being used, and/or if processing an additional work item would result in the consumer node being stressed. Some embodiments include a worker-based task filter that assess whether a consumer node 170 has at least one worker available to perform an operation on a work item (as specified by the operation tag of the work item). If the consumer module 170 has at least one worker available to perform the operation, then the worker-based task filter returns "TRUE," and otherwise the worker-based task filter returns "FALSE."

The consumer nodes 170 continuously and simultaneously claim tasks while the task queue is populated. By utilizing this structure of producer nodes 102 and consumer nodes 170, users may manage work across multiple virtual or physical machines to improve tasks, and/or increase automation, and/or pursue an always-on model appropriately sized to their needs.

Figure 1B:
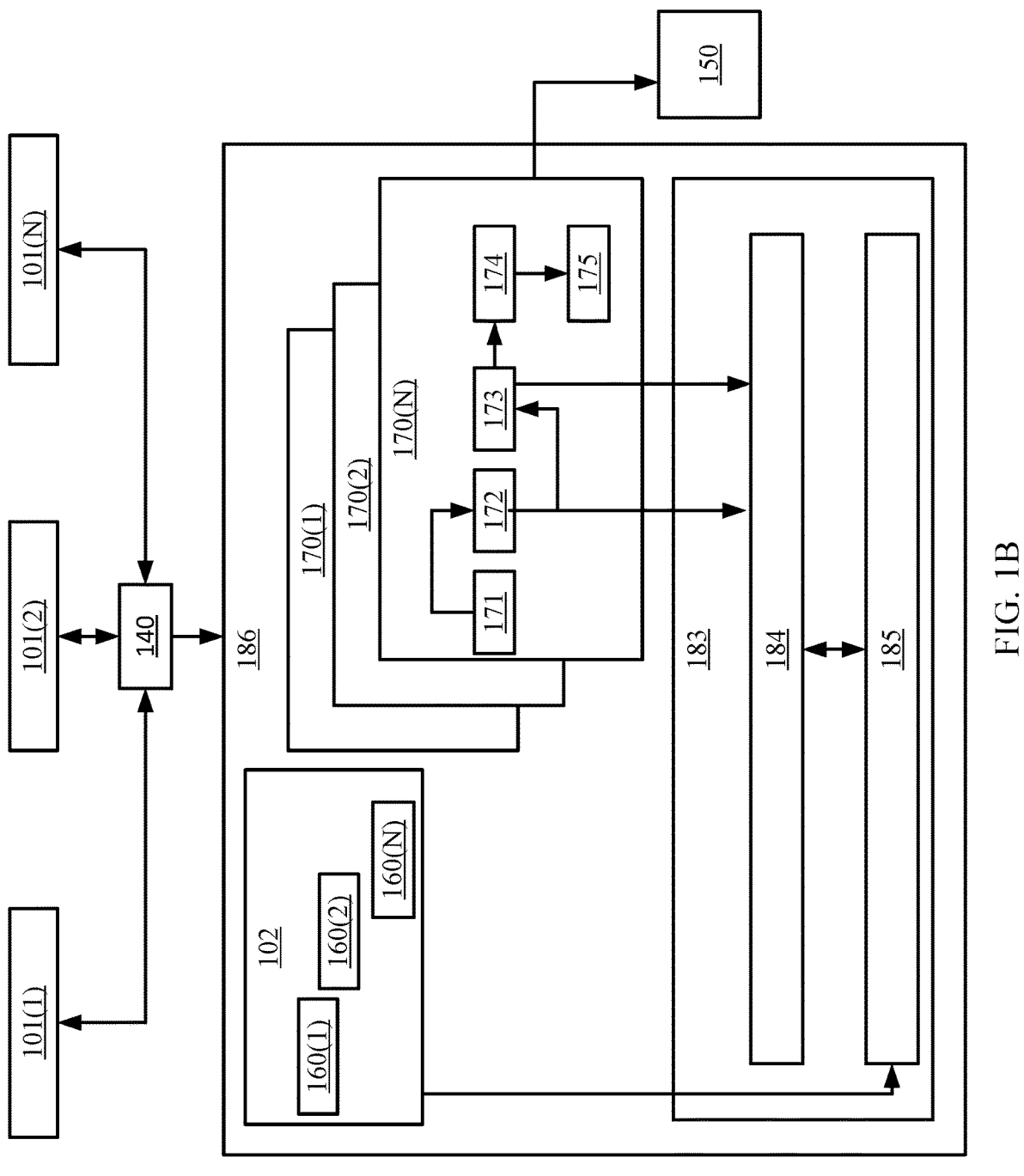

FIG. 1A and FIG. 1B depict a high-level overview of embodiments of a Representational State Transfer (REST) cluster and the flow of data to specialized consumer nodes for processing. One or more callers 101(1)-101(N), or invokers, sends unstructured data over a network 140 to a producer node 102 for processing.

The producer node 102 acts as a single point of interaction for the cluster, accumulating the unstructured data in one node. Utilizing a single point of interaction introduces a layer of abstraction so that each normalization function is performed on a specialized consumer node 170 without the invoker 101 knowing, or needing to know, which consumer node 170 is doing the work. Producer nodes 102 respond to synchronous tasks, such as returning function status, and are responsible for placing asynchronous worker-based operations in the work item queue 185. The API may also check the work item queue 185 status, including queue capacity, and size and status of worker-based operations such as processing, optical character recognition (OCR), or export.

In illustrative embodiments, the producer node 102 organizes the unstructured data into a plurality of work items 160 that may be claimed by consumer nodes 170. Work items 160 specify items of data to be processed. For example, the item of data within a work item may be an exchange database file (EDB file), a disk image file, an email message inside a Microsoft Outlook PST file, a Microsoft Word document, a zip file, an email message, and/or a Lotus Notes database file, to name but a few examples. The producer node 102 embeds each work item 160 with work item metadata.

After embedding the work item 160 with metadata, the producer node 102 adds the work item 160 to a work queue 185. Each work item 160 within the work item queue 185 is initialized to indicate that it has one unprocessed work item 160 associated with it.

Consumer nodes 170 may be configured for specific operations. In a non-limiting example, a consumer node 170 may have memory, central processing unit (CPU), and a set of one or more drives configured for data processing, so that all processing operations are performed by that node. For example, ingestion processes take place in a consumer node 170 with a small amount of memory allocated to the main application and reserved memory for worker processes (outside main application memory).

The consumer nodes 170 comprise node status data which may include a consumer node tag, indicating the specialization of the node.

Each consumer node 170 polls the work item queue 185 to identify work items 160 that correlate to the consumer node. A work item 160 that correlates to a consumer node 170 may be described as being "compatible" with that consumer node. A work item 160 correlates to a consumer node 170 when the consumer node is configured to (i.e., is specialized to) perform a specific operation on the data item within the work item 160. For example, in illustrative embodiments an OCR specialized node 104 will only claim work items 160 having a data item to be subjected to optical character recognition; and a consumer node 170 specialized to search a data item will only claim a work item 160 for which the operation specifies that the work item is to be searched.

Specialized consumer nodes 170 may be grouped in clusters of two or more consumer nodes 170 comprising the same node status data. For example, an ingestion cluster may comprise two or more ingestion nodes 103(1)-103(N), wherein each ingestion node 103 is configured for ingestion tasks 160. Each node may be an existing instance of the indexing program.

FIG. 1B schematically illustrates an embodiment of a system configure to perform an indexing process for unstructured data in a REST cluster 186. Invokers 101(1)-101(N), such as commercial business process models, third-party applications, and/or bespoke applications, communicate with the REST cluster 186 over a network 140. Commonly used network protocols may include, for example, hypertext transfer protocol (HTTP), hypertext transfer protocol secure (HTTPS), secure socket shell (SSH), and short message service (SMS). The indexing operations can employ cloud services (e.g., Microsoft Azure RESTFul API, or Amazon AWS) to operate the actual indexing.

Invokers 101(1)-101(N) send unstructured data over a network 140 to a producer node 102 in the REST cluster 186. The producer node 102 acts as a single point of interaction for the REST cluster 186, introducing a layer of abstraction so that each processing operation is performed on a specialized consumer processor 170 without the invoker 101 needing to know which node 170 is processing the work item 160. Producer nodes 102 respond to synchronous tasks, such as returning function status, and are responsible for placing asynchronous worker-based operations 160 in the work item queue 185.

The producer node 102 organizes the unstructured data into work items 160, that the consumer nodes 170 can claim and process. After organizing the data into work items 160, the producer node 102 embeds each work 160 item with work item metadata. After embedding a work item 160 with metadata, the producer node 102 adds the work item 160 to a work item queue 185.

In illustrative embodiments, the work item queue 185 is stored within an in-memory data grid 183 (e.g., Hazelcast from Hazelcast or Apache Zookeeper from Apache Software Foundation) (herein referred to as Hazelcast for simplicity). This data grid facilitates network-based primitives and collections that are coherent over multiple nodes/servers, and manages the sequencer 171, cursor 172, and sequence barrier 185. Utilizing Hazelcast 183 allows persistence between the nodes and provides shared memory to coordinate task claiming.

In illustrative embodiments, a consumer processor 170 includes a sequencer 171, a cursor 172, a filter chain 173, a task executor 174, and a processing engine 175.

The sequencer 171 stores the work items 160 and coordinates with the work item queue 185 to triage work item 160 claiming by the consumer nodes 170. The cursor 172 selects a work item 160 in the work item queue 185 to be put through the sequence barrier 184 for triaging to the consumer nodes 170. The sequence barrier 184 utilizes the filter chain 173 to process the work item through a series of TRUE/FALSE logic gates in order that the work item 160 is triaged to the proper consumer node 170.

The work item 160 triage system is aided by the use of a search engine such as ELK Stack by Elasticsearch or Cassandra by Apache Software Foundation, though a preferred embodiment utilizes ELK Stack. ELK Stack comprises Elasticsearch, Logstash, and Kibana. Elasticsearch is a multi-node storage system configured for indexing and retrieval by context. Elasticsearch is a noSQL store utilizing unstructured JSON for indexing. Logstash operates as a data transformer for Elasticsearch and converts log data into an elastic index. Kibana is a visualization tool for Elasticsearch. Together, the ELK Stack serves to structure the index of work items 160 into a form that is more easily able to be processed through the sequence barrier 185.

Consumer nodes 170 may be configured for specific operations. In a non-limiting example, a consumer node 170 may have memory, central processing unit (CPU), and drives configured for OCR processing, such that OCR processing operations are performed by that node. The consumer nodes 170 comprise node status data which may include a sever node tag, indicating the specialization of the node. Examples of specialized nodes include, but are not limited to, ingestion nodes 103, OCR nodes 104, and search nodes 105.

Specialized consumer nodes 170 may be grouped in clusters of two or more consumer nodes 170. For example, an ingestion cluster may comprise two or more ingestion nodes 103(1)-103(N), each node 103 specialized in ingestion tasks 160. Each node may be an existing instance of the indexing program.

Consumer nodes 170 may contain node status data indicating CPU status, memory status, worker status, i.e., the state of the machine. If the consumer node 170 is not stressed, that is, if the consumer node 170 has memory, CPU, and worker availability, the consumer node 170 may claim a work item 160.

Consumer nodes 170 poll the work queue 185 for work items 160 and analyze the work item metadata and the consumer node 170 node status data, utilizing a filter chain 173 of TRUE/FALSE logic operations.

In illustrative embodiments, based on the analysis of the filter chain 173 and the consumer node 170 node status data, the task executor 174 claims the work item 160 when all filters return TRUE and locks the work item (e.g., sets a task status tag in the work item's metadata to indicate that said work item has been claimed so that said work item will not be claimed by another consumer node). The task executor 174 then passes the work item 160 to the engine 175 for processing, during which the engine 175 executes a specified operation on the data item within the work item.

In contrast, in illustrative embodiments, if a filter returns FALSE for a given work item, and the consumer node 170 is not stressed, the consumer node does not claim that work item, but instead the consumer node 170 polls the next work item 160. Consumer nodes 170 that are stressed or do not have resources to complete a task cannot claim a new work item 160 for execution. In illustrative embodiments, a consumer node 170 that is not stressed continuously polls the work item queue 185 to claim work items 160 until the queue 185 is unpopulated or the user stops the process.

By utilizing the filter chain 173, work items 160 flow naturally to consumer nodes 170 of a cluster 106 that (1) are specialized for the task and that (2) have capacity to process the work items 160. If the cluster 106 doesn't appear balanced, it is because the consumer nodes 170 are not saturated and do not need to distribute work. This allows for natural load balancing effect, processing speeds over 1 TB/hour and the ability to process zettabytes of information quickly and efficiently.

Figure 2:
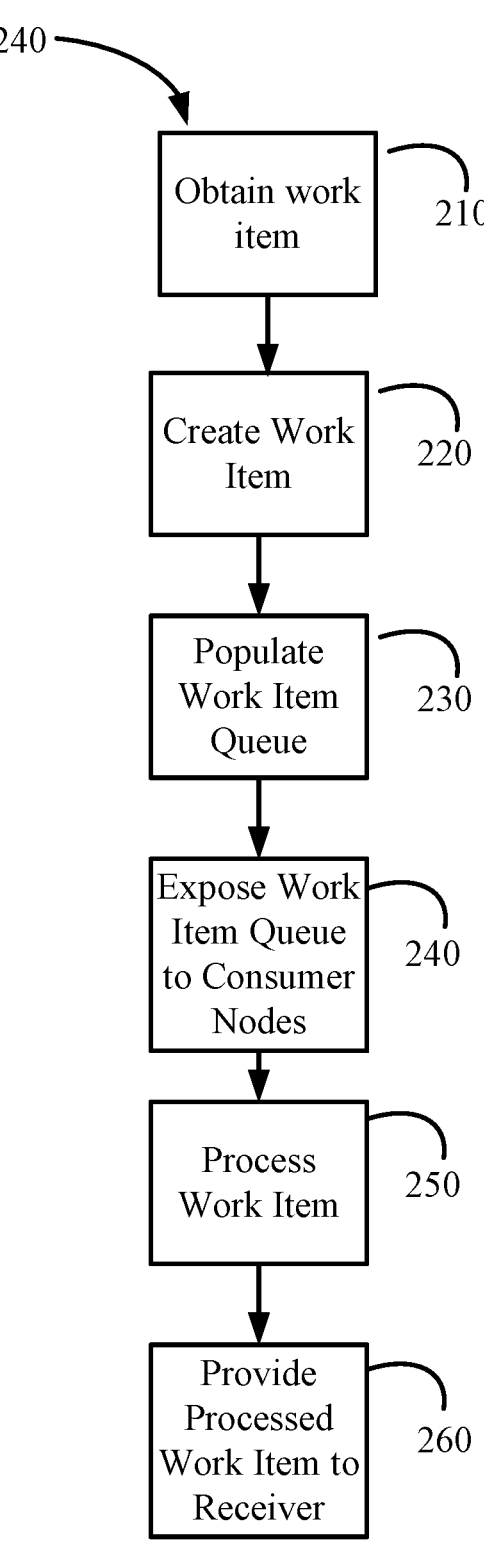
FIG. 2 is a flow chart illustrating a method of operation of a system for processing unstructured data.

FIG. 2 is a flow chart that depicts an embodiment of a method 200 of processing unstructured data.

At step 210, the method receives, at a producer node 102 from an invoker 101 (e.g., a user or client) an item of unstructured data to be processed, along with an operation tag specifying an operation to be performed on that item of unstructured data. In some embodiments, the method receives (along with the tag describing an operation to be performed on that item of unstructured data) an instance (or "copy") of the item of unstructured data to be processed, and in some embodiment the method receives information identifying the location of the item of unstructured data to be processed.

At step 220, the method accesses the item of unstructured data and, for each item of unstructured data, creates a corresponding work item 160. In illustrative embodiments, creation of a corresponding work item 160 is performed by a producer node 102.

Each corresponding work item 160 includes the item of unstructured data, and corresponding work item metadata. The corresponding work item metadata includes at least the tag describing an operation to be performed on that item of unstructured data (which tag may be referred-to as the "operation" tag). In some embodiments, the corresponding work item metadata also includes a tag that indicates whether the work item 160 has been claimed by a consumer node 170.

At step 230, the method populates a work item queue 185. A work item queue 185 is configured to store work items 160 created at step 220. A work item queue 185 is accessible by a plurality of consumer nodes 170. For example, each consumer node 170 of a plurality of consumer nodes is in digital communication with the work item queue 185 to access and evaluate the work items 160 held by the work item queue 185.

At step 240, the method exposes the work item queue 185 to the plurality of consumer nodes 170.

Each consumer node 170 claims a set of work items and, at step 250, at processes each such work item 160 by performing, on the work item's unstructured data item, the operation specified by the operation tag of that work item. A work item 160 processed by a consumer node 170 may be referred-to as a "processed" work item.

At step 260, the method provides each processed work item to a receiver 150. The receiver 150 is, for example, a database or a storage apparatus the cloud, to name but a few examples. In some embodiments, the method provides the processed work item to the invoker 101 that supplied the unstructured data item corresponding to the work item at step 210.

Figure 3:
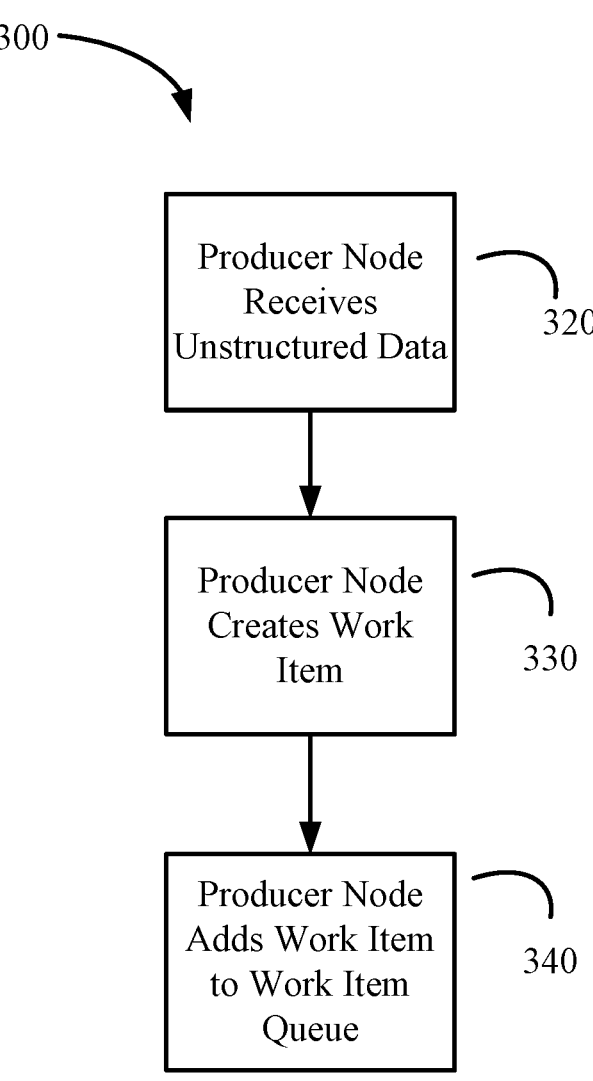
FIG. 3 is a flow-chart for an embodiment of a method of creating a work item queue from unstructured data.

FIG. 3 depicts an embodiment of a method 300 of preparing unstructured data for processing in a REST cluster. At a high level, a producer node 102 receives unstructured data and organizes the data into work items 160, in which each work item includes an item of unstructured data and corresponding work item metadata, and adds the work items 160 to the work item queue 185.

A consumer node 170 determines whether it is stressed and/or has capacity to accept a new work item 160 for processing. If the consumer node 170 is stressed, it does not claim a new work item 160. The consumer node 170 continues to query if it is stressed until the consumer node 170 has capacity for more processing jobs. When the consumer node 170 is not stressed, the consumer node 170 polls the work item queue 185 and analyzes the work item metadata and the consumer node status data to find compatible work items 160 for processing.

In illustrative embodiments, the consumer node 170 analyzes the metadata through a filter chain 173 comprising TRUE/FALSE logic gates. If all of the filters return TRUE, the consumer node 170 claims the work item 160. If a filter returns FALSE, the consumer node 170 repeats polling the work item queue 185 and analyzes another work item 160 in the filter chain 173 while the work item queue 185 is populated.

After claiming a work item 160, the consumer node queries if the work item queue 185 is populated. If the work item queue 185 is populated, the consumer node 170 queries if it is stressed. If the consumer node 170 is not stressed, it repeats the analysis at to claim new work items 160 until the work item queue 185 is not populated or the user halts the program.

The process begins at step 320, wherein a producer node 102 receives unstructured data. For example, the item of data may be an exchange database file (EDB file), a disk image file, an email message inside a Microsoft Outlook PST file, a Microsoft Word document, a zip file, an email message, and a Lotus Notes database file, to name but a few examples.

At step 320, the method (e.g., via a producer node 102) receives unstructured data. In illustrative embodiments, the method receives (e.g., from a plurality of invokers 101) a plurality of unstructured data items.

At step 330, the producer node 102 organizes the unstructured data into (or "creates") work items 160. Each work items 160 specifies an item of unstructured data (e.g., a document) to be processed by a one of the consumer nodes 170, and includes work item metadata. In some embodiments, the work item metadata includes an operation tag, which operation tag specifies the operation to be performed on the data item of the work item 160. In some embodiments, the work item metadata includes a status tag that indicates whether the work item has been claimed by a consumer node 170. A work item 160 binds the data item and the work item metadata together into a unit of information that can be stored individually in a work item queue and individually assessed by a consumer node 170.

At step 340, the producer node 102 adds each work item 160 to the work item queue 185. The work item queue 185 contains individual work items that a single process (e.g., executing at a consumer node 170) can manage, such as an email or a Word document. The work item queue 185 acts as a single point of contact for consumer nodes 170 to claim work items 160 for processing.

In illustrative embodiments, the processes of the consumer node 170 ends after all work items 160 are added to the work item queue 185.

Figure 4A:
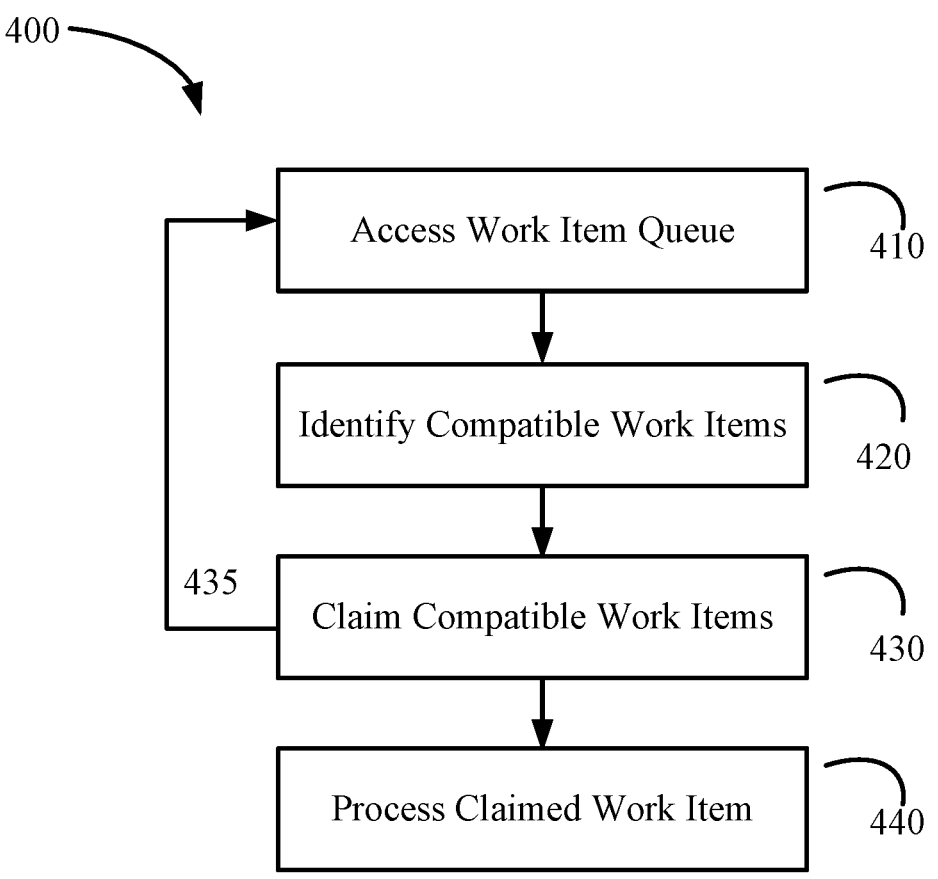
FIG. 4A is a flow-chart for an embodiment of a method of claiming work items from a work item queue.

FIG. 4A depicts an embodiment of a method 400 of operation of a consumer node 170.

At step 410, the consumer node 170 accesses the work item queue 185.

At step 420, the consumer node 170 analyzes the work items 160 from the work item queue 185 to identify a set of work items 160 that correlate to the consumer node 170. In illustrative embodiments, a work item 160 correlates to a consumer node 170 when the consumer node 170 and the work item share a set of parameters. In illustrative embodiments, in order for a work item 160 to correlate to a consumer node 170, the consumer node 170 at a minimum is specialized to perform the operation to be performed on the item of unstructured data of the work item 160.

In illustrative embodiments, each consumer node 170 utilizes logic gates in a filter chain 173 to determine if a work item is compatible with the configuration of the consumer node 170.

Each consumer node 170 contains node status data including a consumer node tag which indicates the specialization of the node, memory and CPU capacity, and worker capacity.

Illustrative embodiments query whether all of the filters return TRUE. If all of the filters return TRUE, the process proceeds to step 430 at which the consumer node 170 claims the work item 160. When feature-based steering is enabled, the consumer node 170 will only claim work items that are directed to that node 170. This allows for a natural load balancing effect, processing speeds over 1 TB/hour, and the ability to process zettabytes of information quickly and efficiently.

Figure 4B:
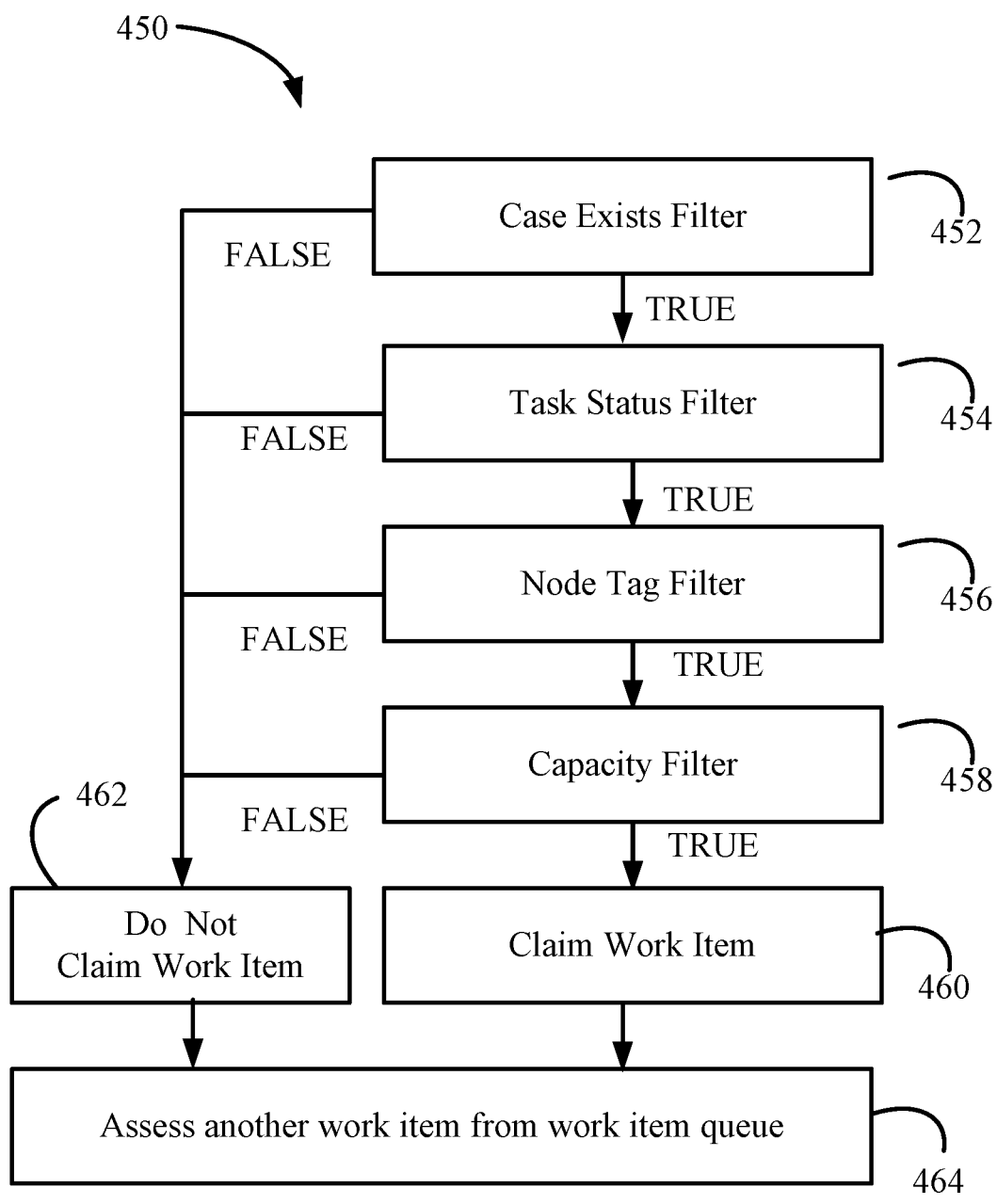
FIG. 4B is a flow-chart for an embodiment of a method of operation of a filter chain.

FIG. 4B is a flow-chart for an embodiment of a method of operation of a filter chain for assessing a work item. In illustrative embodiments, operation of the filter chain is performed by a consumer node 170 in the process of determining whether to claim a work item from a work item queue. If one or more filters return FALSE, the process does not claim the work item, and instead analyzes another work item 160 from the work item queue 185.

The method 450 assesses one or more filters.

Some embodiments include a case exists filter that assesses, at step 452, whether the consumer node 170 has access to the work item 160, or the data item within the work item 160. The data item within the work item 160 may be contained within the work item queue 185, or may reside in a remote location, such a storage location in the cloud or at a storage location at the invoker that provided the data item within the work item 160. The case exists filter returns "TRUE" if the consumer node 170 has access to the work item 160, or the data item within the work item 160, and otherwise returns "FALSE."

Some embodiments include a task status filter that assesses, at step 454, whether the work item 160 is available in that it has not already been claimed by another consumer node 170. The task status filter returns "TRUE" if the work item 160 is available in that it has not already been claimed by another consumer node 170, and otherwise returns "FALSE."

Some embodiments include a node tag filter that assesses, at step 456, a consumer node tag and a work item's operation tag to determine whether the consumer node 170 is specialized to perform the operation specified by work item's operation tag. The node tag filter returns "TRUE" when the consumer node 170 is specialized to perform the operation specified by work item's operation tag, and otherwise returns "FALSE."

Some embodiments include a capacity filter that assesses, at step 458, whether the consumer node is not stressed. The capacity filter returns "TRUE" when the consumer node is not stressed, and otherwise returns "FALSE."

If all filters in the filter chain return "TRUE," then the consumer node 170 claims the work item 160, at step 560. If any filter in the filter chain returns "FALSE," then the consumer node 170 declines to claim (and does not claim) the work item 160, at step 562.

At step 464, the method 450 assesses another work item 160 from the work item queue by application of the filter chain to that other work item 160.

The following examples illustrate some embodiments of the operation of a filter chain.

Example 1

A filter chain 173 includes a case exists filter, a node tag filter, and a capacity filter.

The consumer node 170 checks the work item metadata of a given work item 160 to determine whether (or to confirm that) the consumer node 170 has local access to the work item 160. If so, the case exists filter returns TRUE.

The consumer node 170 compares the work item metadata of the given work item 160 to the node tag of the consumer node 170 to determine whether (or to confirm that) the consumer node 170 is configured (or specialized) to perform the operation to be performed on the work item 160. For example, an OCR work item 160 is compatible with a consumer server 170 with an OCR node tag. If the work item 160 is compatible with the consumer node tag, the node tag filter returns TRUE.

Because, in this example, the consumer node 170 has access to the work item 160, and because the consumer node 170 is specialized to perform the specified operation on the work item 160, the work item 160 is correlated to the consumer node. If the consumer node 170 does not have access to the work item 160, and/or if the consumer node 170 is not specialized to perform the specified operation on the work item 160, the work item 160 is would not be correlated to the consumer node.

The consumer node 170 also checks the node status data of the consumer node 170 for capacity status. If the consumer node 170 is not stressed, the capacity filter returns TRUE.

In this example, because all of the filters in the filter chain 173 return TRUE, the consumer node 170 claims the work item 160.

Example 2

For example, the filter chain 173 may include a case exists filter, a task status filter, and a capacity filter.

The case exists filter and capacity filter function as in example 1.

The consumer node 170 checks whether the work item 160 is in a STARTED or NOT_STARTED state (or, to confirm that the work item is in a "NON-STARTED state), that is, whether processing has begun on the work item 160.

When the task status filter returns TRUE (i.e., the work item 160 is in a non-started state; i.e., the work item 160 has not already been claimed by a consumer node 170), and since the other filters returned TRUE, the consumer node 170 claims the work item 170 and sets the status filter to "STARTED."

Conversely, if the work item 160 is in the STARTED state, the task status filter returns FALSE. Because at least one filter returned FALSE, the work item 160 does not correlate to the consumer node 170, and the consumer node 170 does not claim the work item 160.

Example 3

For example, the filter chain 173 may include a task status filter, a capacity filter, and a node tag filter. These filters function as in examples 1 and 2. If the processing has begun on a work item 160, the task status filter returns FALSE. If the consumer node 170 is stressed, the capacity filter returns FALSE. IF the node tag of the consumer node 170 does not match the work item metadata, the node tag filter returns FALSE. Because at least one filter has returned FALSE, the work item 160 does not correlate to the consumer node 170, and the consumer node 170 does not claim the work item 160.

After the consumer node 170 claims the work item 160 at step 430, the process proceeds to step 440, at which the method processes (i.e., performs the operation specified by the work item's operation tag) the item of unstructured data in work item 160. The specified operation is an operation for which the consumer node 170 is specialized.

In some embodiments, after claiming a compatible work item 160 at step 430, the method 400 loops back (step 435) to step 410, to search for one or more additional compatible work items.

In some embodiments, prior to looping back to step 410, the consumer node 170 assess whether the work item queue 185 is empty, or if the user has halted the process. If YES, the process ends. If the work item queue 185 is not populated, there are no more work items 160 process and the process ends. Likewise, if a user has halted the process, the process ends.

In some embodiments, prior to looping back to step 410, the consumer node 170 assess whether the consumer node itself is stressed. If so, the consumer node 170 does not loop back to step 410.

If the consumer node 170 is not stressed, the process repeats at step 410 wherein the consumer node 170 analyzes the work item metadata.

Repeating the process while consumer nodes 170 are not stressed and the work item queue 185 is populated results in a natural load-balancing effect, ensuring that data is processed efficiently.

A listing of certain reference numbers is presented below.
101: invoker;
102: producer node;
103: ingestion node;
104: OCR node;
105: search node;
106: cluster;
140: network;
150: receiver;
160: work item;
170: consumer node;
171: sequencer;
172: cursor;
173: filter chain;
174: task executor;
175: processing engine;
183: in-memory data grid;
184: sequence barrier
185: work item queue;
186: REST cluster.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A data processing system for normalizing heterogeneous unstructured data, the system comprising:
   a producer server configured to receive a set of data, create a plurality of work items based upon the set of data, embed each of the plurality of work items with work item metadata, and create a work queue comprising the plurality of work items; and
   a first consumer server configured to claim a first portion of work items from the work queue based on the work item metadata and a filter chain;
   at least a second consumer server configured to claim a second portion of work items from the work queue based on the work item metadata and the filter chain;
   wherein the first consumer server and second consumer server each simultaneously claim work items from the work queue, and
   wherein the first consumer server and second consumer server repeatedly analyze the metadata and filter chain and claim work items from the work queue.

P2. The system as described in potential claim P1, wherein the filter chain comprises a plurality of true/false conditions.

P3. The system as described in potential claims P1-P2, wherein the plurality of true/false conditions comprises one or more of: a case exists filter, a task status filter, a capacity filter, a node tag filter, and a worker based task filter.

P4. The system as described in potential claims P1-P3, wherein the node status data comprises one or more of task status, capacity status, node tag, and worker status.

P5. The system as described in potential claims P1-P4, wherein if a consumer server is stressed it does not claim work from the work queue.

P6. The system as described in potential claims P1-P5, wherein the plurality of consumer servers have the same node status data.

P7. A data processing system for normalizing heterogeneous unstructured data, the system comprising:
   a producer server configured to receive a set of data, create a plurality of work items based upon the set of data, embed each of the plurality of work items with work item metadata, and create a work queue comprising the plurality of work items; and a first consumer server comprising first server metadata, wherein the first server metadata comprises task status, capacity status, node tag, and worker status;

the first consumer server configured to analyze the work item metadata and the first server metadata and claim a first plurality of work items from the work queue based on analyzing the work item metadata and the first sever metadata;

at least a second consumer server comprising second consumer metadata, wherein the second sever metadata comprises task status, capacity status, node tag, and worker status;

the second consumer server configured to analyze the work item metadata and the second server metadata and claim a second plurality of work items from the work queue based on analyzing the work item metadata and the second server metadata; and the first consumer server and the second consumer server continuously and simultaneously claim work from the work queue.

P8. The system as described in potential claim P7, wherein if a consumer server is stressed it does not claim work from the work queue.

P9. The system as described in potential claims P7-P8, wherein the node tag of the first consumer sever and the node tag of the second consumer server are the same.

P101. A computer-implemented system for distributing data to processing nodes, the system comprising:

a producer node configured to:

receive a set of unstructured data items, create a set of work items based upon the set of unstructured data items, wherein each work item of the set of work items comprises a data item from the set of unstructured data items and a plurality of work item metadata corresponding to said data item, and populate a work item queue with the set of work items;

a plurality of consumer nodes, each consumer nodes of the plurality of consumer nodes comprising corresponding node status data, wherein each consumer node of the plurality of consumer nodes is configured to:

repeatedly poll the work item queue to identify a set of work items that are compatible with the consumer node based on the plurality of work item metadata, a filter chain, and the node status data, and to claim said work items from the work item queue, wherein each consumer node of the plurality of consumer nodes produces a corresponding set of selectively claimed work items.

P102. The system as described in P101, wherein the filter chain comprises a plurality of true/false conditions.

P103. The system as described in P102, wherein the plurality of true/false conditions comprises one or more of: a case exists filter, a task status filter, a capacity filter, a node tag filter, and a worker-based task filter.

P104. The system as described in any of P101-P103, wherein the node status data comprises one or more of capacity status, node tag, and worker status.

P105. The system as described in any of P101-P104, wherein if a consumer node is stressed it does not claim work from the work queue.

P106. The system as described in any of P101-P105, wherein the plurality of consumer nodes have the same node status data.

P107. A computer-implemented method of distributing a plurality of documents among a plurality of consumer nodes, each consumer node of the plurality of consumer nodes having corresponding node status data, the method comprising, for each consumer node of the plurality of consumer node:

accessing a work item queue, wherein the work item queue comprises a plurality of work items, each work item of the plurality of work items comprising (i) a document from the plurality of documents and (ii) work item metadata corresponding to said document;

identifying from the plurality of work items a work item that is compatible with the consumer node;

claiming said work item corresponding to the consumer node; and repeating said steps as long as the consumer node is not stressed and the work item queue comprises at least one work item corresponding to the consumer node, which at least one such work item has not been claimed by a one of the consumer node.

P108. The method as described in P107, wherein identifying from the plurality of work items a work item that is compatible with the consumer node comprises, identifying, via a filter chain, a work item for which the work item metadata for the given work item matches the consumer node metadata.

P109. The method as described in claim P108, wherein the filter chain comprises a plurality of true/false conditions.

P110. The method as described in P109, wherein the plurality of true/false conditions comprises one or more of: a case exists filter, a task status filter, a capacity filter, a node tag filter, and a worker based task filter.

P111. The method as described in P108, wherein the node status data comprises one or more of capacity status, node tag, and worker status.

P112. The method as described in P109 wherein a consumer node declines to claim a work item of any item of the filter chain analysis returns FALSE.

P113. A non-transitory computer-readable medium storing computer-executable code thereon, the code comprising:

code for accessing, at a consumer node, a work item queue comprising a plurality of work items, wherein each work item of in the plurality of work items comprises an item of unstructured data and work item metadata; and for each work item of the plurality of work items:

code for analyzing the work item metadata according to a filter chain;

code for analyzing node status data according to the filer chain; and code for claiming a work item of the plurality of work items based on the analysis of the work item metadata and the analysis of the node status data.

P114. The non-transitory computer-readable medium of P113, wherein the filter chain comprises a plurality of true/false conditions.

P115. The non-transitory computer-readable medium of P114, wherein the plurality of true/false conditions comprises one or more of: a case exists filter, a task status filter, a capacity filter, a node tag filter, and a worker-based task filter.

P116. The non-transitory computer-readable medium of P113, wherein the node status data comprises one or more of capacity status, node tag, and worker status.

P117. The non-transitory computer-readable medium of P113, wherein the code further comprises:
code for determining whether the consumer node is stressed, and for causing the consumer node to decline to claim a work item from the work queue accordingly.

P118. The non-transitory computer-readable medium of P113, wherein the code further comprises:
code for operating a plurality of consumer nodes in parallel, each such consumer node having the same node status data.

P119. The non-transitory computer-readable medium of P113, wherein each work item as a task status tag in the work item's metadata and the code further comprises:
code for, after claiming a work item from the work item queue, setting the task status tag to indicate that said work item has been claimed so that said work item will not be claimed by another consumer node.

P120. The non-transitory computer-readable medium of P113, wherein code for claiming a work item of the plurality of work items based on the analysis of the work item metadata and the analysis of the node status data comprises:
code for determining whether the consumer node is specialized to process the work item.

P201. A computer-implemented system for distributing data to processing nodes, the system comprising:
a set of producer nodes, each such producer node configured to:
receive a plurality of data items, the plurality of data items comprising a set of data items, and a plurality of operation tags, the plurality of operation tags comprising a set of operation tags, each operation tag of the set of operation tags specifying an operation selected from a set of operations, each operation tag uniquely associated with a corresponding data item from the set of data items;
create a plurality of work items, each work item comprising a data item from the set of data items bound to the operation tag uniquely associated with said data item;
populate a work item queue with the set of work items; and
expose the work item queue to a plurality of consumer nodes, each consumer node of the plurality of consumer nodes configured to selectively claim one or more work items from the work item queue.

P202. The computer-implemented system of P201, wherein each consumer node of the plurality of consumer nodes is specialized to perform an operation selected from the plurality of operations.

P203. The computer-implemented system of P201, wherein:
each consumer node of the plurality of consumer nodes is specialized to perform an operation selected from the plurality of operations; and
each consumer node of the plurality of consumer nodes is configured to assess work items from the work item queue to determine, for each such work item, whether said consumer node is specialized to perform the operation specified by the operation tag of the work item.

P204. The computer-implemented system of P201, wherein:

each consumer node of the plurality of consumer nodes is specialized to perform an operation selected from the plurality of operations; and
each consumer node of the plurality of consumer nodes is configured to:
(a) assess work items from the work item queue to ascertain, for each such work item, that said consumer node is specialized to perform the operation specified by the operation tag of the work item, each such work item being a compatible work item, and
(b) to claim the compatible work item for processing by the consumer node, to the exclusion of other consumer nodes from the plurality of consumer nodes, said compatible work item being a claimed work item.

P205. The computer-implemented system of P204, wherein:
each work item comprises a status tag indicating whether such work item has been claimed by a consumer node from the plurality of consumer nodes, and
each consumer node is configured to update the status tag of each claimed work item claimed by said consumer node, so that the status tag of said work item indicates that said work item has been claimed by a consumer node from the plurality of consumer nodes.

P206. The computer-implemented system of any of P201-P205, wherein the producer node is further configured to include, in each work item, a status tag, said status tag editable by a consumer node to indicate that said consumer node has claimed the work item.

P207. The computer-implemented system of any of P201-P206, wherein the plurality of data items comprise plurality of unstructured data items.

P208. A method of distributing data to processing nodes, the method comprising:
receiving, at set of produce nodes, a plurality of data items, the plurality of data items comprising a set of data items, and a plurality of operation tags, the plurality of operation tags comprising a set of operation tags, each operation tag of the set of operation tags specifying an operation selected from a set of operations, each operation tag uniquely associated with a corresponding data item from the set of data items;
creating a plurality of work items, each work item comprising a data item from the set of data items bound to the operation tag uniquely associated with said data item;
populating a work item queue with the set of work items; and
exposing the work item queue to a plurality of consumer nodes, each consumer node of the plurality of consumer nodes configured to selectively claim one or more work items from the work item queue.

P209. The method of P208, wherein each consumer node of the plurality of consumer nodes is specialized to perform an operation selected from the plurality of operations.

P210. The method of P208, wherein:
each consumer node of the plurality of consumer nodes is specialized to perform an operation selected from the plurality of operations; and
each consumer node of the plurality of consumer nodes is configured to assess work items from the work item queue to determine, for each such work item, whether said consumer node is specialized to perform the operation specified by the operation tag of the work item.

P211. The method of P208, wherein:

each consumer node of the plurality of consumer nodes is specialized to perform an operation selected from the plurality of operations; and each consumer node of the plurality of consumer nodes is configured to:

(a) assess work items from the work item queue to ascertain, for each such work item, that said consumer node is specialized to perform the operation specified by the operation tag of the work item, each such work item being a compatible work item, and (b) to claim the compatible work item for processing by the consumer node, to the exclusion of other consumer nodes from the plurality of consumer nodes, said compatible work item being a claimed work item.

P212. The method of any of P208-P211, wherein:

each work item comprises a status tag indicating whether such work item has been claimed by a consumer node from the plurality of consumer nodes, and each consumer node is configured to update the status tag of each claimed work item claimed by said consumer node, so that the status tag of said work item indicates that said work item has been claimed by a consumer node from the plurality of consumer nodes.

P213. The method of any of P208-P212, wherein the producer node is further configured to include, in each work item, a status tag, said status tag editable by a consumer node to indicate that said consumer node has claimed the work item.

P214. The method of any of P208-P213, wherein the plurality of data items comprise plurality of unstructured data items.

P215. A non-transitory computer-readable medium storing computer-executable code thereon, the code comprising:

code for receiving, as a set of producer nodes, a plurality of data items, the plurality of data items comprising a set of data items, and a plurality of operation tags, the plurality of operation tags comprising a set of operation tags, each operation tag of the set of operation tags specifying an operation selected from a set of operations, each operation tag uniquely associated with a corresponding data item from the set of data items;

code for creating a plurality of work items, each work item comprising a data item from the set of data items bound to the operation tag uniquely associated with said data item;

code for populating a work item queue with the set of work items; and code for exposing the work item queue to a plurality of consumer nodes, each consumer node of the plurality of consumer nodes configured to selectively claim one or more work items from the work item queue.

P216. The non-transitory computer-readable medium of P215, wherein each consumer node of the plurality of consumer nodes is specialized to perform an operation selected from the plurality of operations.

P217. The non-transitory computer-readable medium of P215, wherein:

each consumer node of the plurality of consumer nodes is specialized to perform an operation selected from the plurality of operations; and each consumer node of the plurality of consumer nodes is configured to assess work items from the work item queue to determine, for each such work item, whether said consumer node is specialized to perform the operation specified by the operation tag of the work item.

P218. The non-transitory computer-readable medium of P215, wherein:

each consumer node of the plurality of consumer nodes is specialized to perform an operation selected from the plurality of operations; and each consumer node of the plurality of consumer nodes is configured to:

(a) assess work items from the work item queue to ascertain, for each such work item, that said consumer node is specialized to perform the operation specified by the operation tag of the work item, each such work item being a compatible work item, and (b) to claim the compatible work item for processing by the consumer node, to the exclusion of other consumer nodes from the plurality of consumer nodes, said compatible work item being a claimed work item.

P219. The non-transitory computer-readable medium of any of P215-P218, wherein:

each work item comprises a status tag indicating whether such work item has been claimed by a consumer node from the plurality of consumer nodes, and each consumer node is configured to update the status tag of each claimed work item claimed by said consumer node, so that the status tag of said work item indicates that said work item has been claimed by a consumer node from the plurality of consumer nodes.

P220. The non-transitory computer-readable medium of any of P215-P219, wherein the producer node is further configured to include, in each work item, a status tag, said status tag editable by a consumer node to indicate that said consumer node has claimed the work item.

P301. A computer-implemented system for processing a plurality of data items, the system comprising:

a work item queue storing a set of work items, each work item comprising a plurality of work items, each work item of the plurality of work items comprising (i) a data item from the plurality of data items and (ii) work item metadata corresponding to said data item;

a plurality of consumer nodes, each consumer nodes of the plurality of consumer nodes comprising corresponding node status data, wherein each consumer node of the plurality of consumer nodes is specialized to perform an operation selected from the plurality of operations, and is configured to:

access the work item queue;

identify, using a filter chain, a work item from the plurality of work items that is compatible with the consumer node; and claim said work item corresponding to the consumer node.

P302. The computer-implemented system of P301, wherein:

the work item metadata of each work item includes an operation tag specifying an operation to be performed on the data item of the work item, and the node status data of each consumer node specified an operation for which the consumer node is specialized, and each consumer node is configured to identify a work item that is compatible with the consumer node by determining that the operation to be performed on the data item of the work item, as specified by the work item operation tag, matches the operation for which the consumer node is specialized as specified in the node status data.

P303. The computer-implemented system of any of P301-P302, wherein:

the work item metadata of each work item includes a status tag recording the status of whether the work item has been previously claimed by a consumer node from the plurality of consumer nodes; and each consumer node is configured to assess the status tag of a work item and to refrain from claiming any work item having a status tag indicating that the work item has been previously claimed by a consumer node from the plurality of consumer nodes.

P304. The computer-implemented system of any of P301-P303, wherein each consumer node is configured to determine that it is stressed, and consequently to refrain from claiming any work item.

P305. The computer-implemented system of any of P301-P304, wherein each consumer node is configured to determine that the consumer node lacks access to a work item, and consequently to refrain from claiming the work item.

P306. The computer-implemented system of any of P301-P305, wherein each consumer node of the plurality of consumer nodes is configured to assess work items from the work item queue to determine, for each such work item, whether said consumer node is specialized to perform the operation specified by the operation tag of the work item.

P307. The computer-implemented system of any of P301-P306, further comprising:

a set of producer nodes, each such producer node configured to:

receive a plurality of data items, the plurality of data items comprising a set of data items, and a plurality of operation tags, the plurality of operation tags comprising a set of operation tags, each operation tag of the set of operation tags specifying an operation selected from a set of operations, each operation tag uniquely associated with a corresponding data item from the set of data items;

create the plurality of work items, each work item comprising a data item from the set of data items bound to the operation tag uniquely associated with said data item;

populate the work item queue with the set of work items; and expose the work item queue to the plurality of consumer nodes, each consumer node of the plurality of consumer nodes configured to selectively claim one or more work items from the work item queue.

P308. A computer-implemented method of distributing a plurality of data items among a plurality of consumer nodes, each consumer node of the plurality of consumer nodes having corresponding node status data, the method comprising, for each consumer node of the plurality of consumer node:

accessing a work item queue, wherein the work item queue comprises a plurality of work items, each work item of the plurality of work items comprising (i) a data item from the plurality of data items and (ii) work item metadata corresponding to said data item, said work item metadata comprising at least an operation tag specifying an operation to be performed on said data item;

identifying from the plurality of work items in the work item queue a work item that is compatible with the consumer node;

claiming said work item; and performing the operation on the data item of the work item.

P309. The computer-implemented method of P308, wherein identifying a work item that is compatible with the consumer node comprises identifying said work item by application of a filter chain.

P310. The computer-implemented method of P309, wherein the filter chain comprises a plurality of true/false conditions.

P311. The computer-implemented method of P310, wherein a consumer node declines to claim a work item of any item of the filter chain analysis returns FALSE.

P312. The computer-implemented method of any of P309-P311, wherein the filter chain comprises:

a case exists filter that assess whether the consumer node has access to the work item.

P313. The computer-implemented method of any of P309-P312, wherein the filter chain comprises:

a task status filter that assesses a status tag to determine whether a given task has already been claimed by another consumer node.

P314. The computer-implemented method of any of P309-P313, wherein the filter chain comprises:

a node tag filter that assesses a consumer node tag and a work item's operation tag to determine whether the consumer node is specialized to perform the operation specified by the work item's operation tag.

P315. The computer-implemented method of any of P309-P314, wherein the filter chain comprises:

a capacity filter that assesses whether the consumer node is not stressed.

P316. A non-transitory computer-readable medium storing computer-executable code thereon, the code comprising:

code for accessing a work item queue, wherein the work item queue comprises a plurality of work items, each work item of the plurality of work items comprising (i) a data item from the plurality of data items and (ii) work item metadata corresponding to said data item, said work item metadata comprising at least an operation tag specifying an operation to be performed on said data item;

code for identifying from the plurality of work items in the work item queue a work item that is compatible with the consumer node;

code for claiming said work item; and code for performing the operation on the data item of the work item.

P317. The non-transitory computer-readable medium of P316, wherein code for identifying from the plurality of work items in the work item queue a work item that is compatible with the consumer node comprises code for identifying said work item by application of a filter chain.

P318. The non-transitory computer-readable medium of P317, wherein the filter chain comprises a plurality of true/false conditions.

P319. The non-transitory computer-readable medium of any of P317-P318, wherein the filter chain comprises:
a case exists filter that assess whether the consumer node has access to the work item; and
a task status filter that assesses a status tag to determine whether a given task has already been claimed by another consumer node.

P320. The non-transitory computer-readable medium of any of P317-P319, wherein the filter chain comprises:
a node tag filter that assesses a consumer node tag and a work item's operation tag to determine whether the consumer node is specialized to perform the operation specified by the work item's operation tag; and
a capacity filter that assesses whether the consumer node is not stressed.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transitory computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-implemented system for processing a plurality of data items, the system comprising:
a computer configured to provide a plurality of consumer nodes, each consumer node of the plurality of consumer nodes comprising corresponding node status data, wherein each consumer node of the plurality of consumer nodes is specialized to perform an operation selected from a plurality of operations, and is configured to:
access a work item queue, the work item queue storing a set of work items, each work item comprising (i) a data item from the plurality of data items and (ii) work item metadata corresponding to said data item;
identify, using a filter chain, a work item from the plurality of work items that is compatible with the consumer node, wherein the filter chain comprises at least one of
a case exists filter that assesses whether the consumer node has access to the work item;
a task status filter that assesses a status tag to determine whether a given task has already been claimed by another consumer node;
a node tag filter that assesses a consumer node tag and a work item's operation tag to determine whether the consumer node is specialized to perform the operation specified by the work item's operation tag; and
a capacity filter that assesses whether the consumer node is not stressed; and
claim said work item corresponding to the consumer node.

2. The computer-implemented system of claim 1, wherein:
the work item metadata of each work item includes an operation tag specifying an operation to be performed on the data item of the work item, and the node status data of each consumer node specifies an operation for which the consumer node is specialized, and
each consumer node is configured to identify a work item that is compatible with the consumer node by determining that the operation to be performed on the data item of the work item, as specified by the work item operation tag, matches the operation for which the consumer node is specialized as specified in the node status data.

3. The computer-implemented system of claim 1, wherein:
the work item metadata of each work item includes a status tag recording the status of whether the work item has been previously claimed by a consumer node from the plurality of consumer nodes; and
each consumer node is configured to assess the status tag of a work item and to refrain from claiming any work item having a status tag indicating that the work item has been previously claimed by a consumer node from the plurality of consumer nodes.

4. The computer-implemented system of claim 1, wherein each consumer node is configured to determine that it is stressed, and consequently to refrain from claiming any work item.

5. The computer-implemented system of claim 1, wherein each consumer node is configured to determine that the consumer node lacks access to a work item, and consequently to refrain from claiming the work item.

6. The computer-implemented system of claim 1, wherein each consumer node of the plurality of consumer nodes is configured to assess work items from the work item queue to determine, for each such work item, whether said consumer node is specialized to perform the operation specified by the operation tag of the work item.

7. The computer-implemented system of claim 1, further comprising:

a set of producer nodes, each such producer node configured to:

receive a plurality of data items, the plurality of data items comprising a set of data items, and a plurality of operation tags, the plurality of operation tags comprising a set of operation tags, each operation tag of the set of operation tags specifying an operation selected from a set of operations, each operation tag uniquely associated with a corresponding data item from the set of data items;

create the plurality of work items, each work item comprising a data item from the set of data items bound to the operation tag uniquely associated with said data item;

populate the work item queue with the set of work items; and expose the work item queue to the plurality of consumer nodes, each consumer node of the plurality of consumer nodes configured to selectively claim one or more work items from the work item queue.

8. A computer-implemented method of distributing a plurality of data items among a plurality of consumer nodes, each consumer node of the plurality of consumer nodes having corresponding node status data, the method comprising, for each consumer node of the plurality of consumer nodes:

accessing a work item queue, wherein the work item queue comprises a plurality of work items, each work item of the plurality of work items comprising (i) a data item from the plurality of data items and (ii) work item metadata corresponding to said data item, said work item metadata comprising at least an operation tag specifying an operation to be performed on said data item;

identifying from the plurality of work items in the work item queue a work item that is compatible with the consumer node by application of a filter chain, wherein the filter chain comprises at least one of a case exists filter that assesses whether the consumer node has access to the work item;

a task status filter that assesses a status tag to determine whether a given task has already been claimed by another consumer node;

a node tag filter that assesses a consumer node tag and a work item's operation tag to determine whether the consumer node is specialized to perform the operation specified by the work item's operation tag; and a capacity filter that assesses whether the consumer node is not stressed;

claiming said work item; and performing the operation on the data item of the work item.

9. The computer-implemented method of claim 8, wherein the filter chain comprises a plurality of true/false conditions.

10. The computer-implemented method of claim 9, wherein a consumer node declines to claim a work item of any item of the filter chain analysis returns FALSE.

11. The computer-implemented method of claim 8, wherein the filter chain comprises:

a case exists filter that assesses whether the consumer node has access to the work item.

12. The computer-implemented method of claim 8, wherein the filter chain comprises:

a task status filter that assesses a status tag to determine whether a given task has already been claimed by another consumer node.

13. The computer-implemented method of claim 8, wherein the filter chain comprises:

a node tag filter that assesses a consumer node tag and a work item's operation tag to determine whether the consumer node is specialized to perform the operation specified by the work item's operation tag.

14. The computer-implemented method of claim 8, wherein the filter chain comprises:

a capacity filter that assesses whether the consumer node is not stressed.

15. A non-transitory computer-readable medium storing computer-executable code thereon, the code comprising:

code for accessing a work item queue, wherein the work item queue comprises a plurality of work items, each work item of the plurality of work items comprising (i) a data item from a plurality of data items and (ii) work item metadata corresponding to said data item, said work item metadata comprising at least an operation tag specifying an operation to be performed on said data item;

code for identifying from the plurality of work items in the work item queue a work item that is compatible with the consumer node by application of a filter chain, wherein the filter chain comprises at least one of:

a case exists filter that assesses whether the consumer node has access to the work item;

a task status filter that assesses a status tag to determine whether a given task has already been claimed by another consumer node;

a node tag filter that assesses a consumer node tag and a work item's operation tag to determine whether the consumer node is specialized to perform the operation specified by the work item's operation tag; and a capacity filter that assesses whether the consumer node is not stressed;

code for claiming said work item; and code for performing the operation on the data item of the work item.

16. The non-transitory computer-readable medium of claim 15, wherein the filter chain comprises a plurality of true/false conditions.

17. The non-transitory computer-readable medium of claim 16, wherein the filter chain comprises:

a case exists filter that assess whether the consumer node has access to the work item; and a task status filter that assesses a status tag to determine whether a given task has already been claimed by another consumer node.

18. The non-transitory computer-readable medium of claim 16, wherein the filter chain comprises:

a node tag filter that assesses a consumer node tag and a work item's operation tag to determine whether the consumer node is specialized to perform the operation specified by the work item's operation tag; and a capacity filter that assesses whether the consumer node is not stressed.

\* \* \* \* \*